Feb. 18, 1947.                R. R. CURTIS                2,415,994
                    AUTOMATIC TEMPERATURE CONTROL DEVICE
                           Filed Jan. 24, 1944
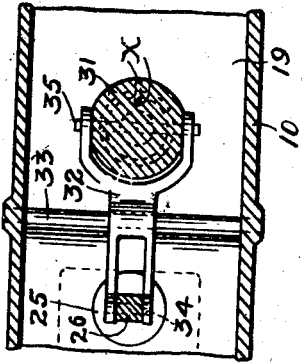
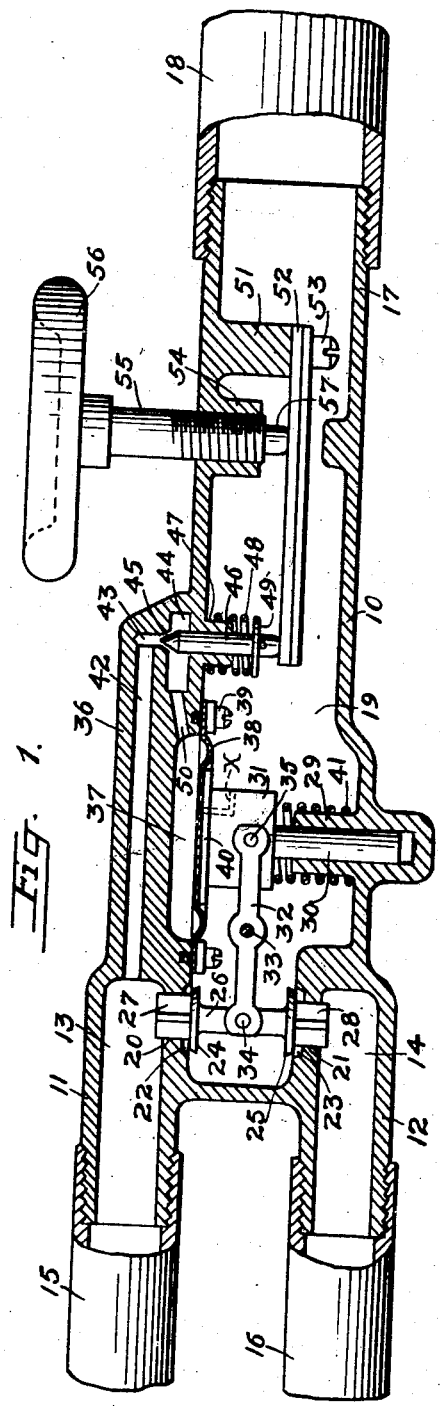
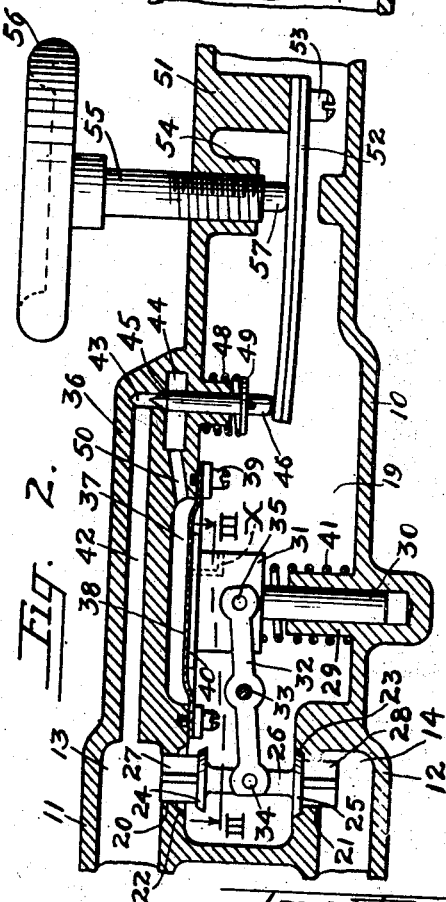
Inventor
Russell R. Curtis.
by Charles H. Kelly
Attys Patented Feb. 18, 1947

2,415,994

UNITED STATES PATENT OFFICE 2,415,994

AUTOMATIC TEMPERATURE CONTROL DEVICE

Russell R. Curtis, Dayton, Ohio, assignor, by mesne assignments, to Curtis Automotive Devices, Inc., Dayton, Ohio, a corporation of Ohio Application January 24, 1944, Serial No. 519,428

8 Claims. (Cl. 236—12)

My invention relates to fluid temperature control and particularly to an improved device functioning automatically to mix hot and cold fluid, such as water, in proper proportions to maintain any desired outlet or service fluid temperature.

An important object of the invention is to provide a device for the purpose referred to in which flow controlling valve mechanism apportions the inflow of cold and hot fluid into a mixing chamber together with means automatically controlled by the temperature of the fluid mixture and the pressure of one of the fluid inflows for controlling the inflow valve structure.

A further object is to provide an arrangement in which setting mechanism for the inflow apportioning valve structure is automatically controlled by the pressure of one of the inflows under control by the temperature of the fluid mixture.

Still a further object is to provide an arrangement in which setting means for the inflow apportioning valve structure is conjointly controlled mechanically, as by spring means, and hydraulically by pressure from one of the inflows, and with such pressure under control of the temperature of the fluid mixture.

The various features of my invention are embodied in the structure shown on the drawing, in which Figure 1 is a longitudinal section of my improved device showing the valves in one position;

Figure 2 is a similar section showing the valves in another position; and

Figure 3 is a section on plane III—III Figure 2.

The device shown comprises a substantially tubular body 10 having the two inlet legs 11 and 12 with inlet bores 13 and 14, respectively. The inlet legs are connectable with piping 15 and 16 for flow thereto of fluid at different temperatures. For example, the pipe 15 may supply cold water to the inlet leg 11 and the pipe 16 hot water to the inlet leg 12. The outlet end 17 of the device is connectable with piping 18 for service delivery of the mixed inlet flows.

The portion of the device adjacent to the inlet legs provides a mixing chamber 19, the opposed walls of the inlet legs having inlet passages 20 and 21, respectively, for flow from the inlet bores 13 and 14 into the mixing chamber. At the inner ends of the passages 20 and 21 are the valve seats 22 and 23 for the valves 24 and 25, respectively, these valves having a common stem 26. Guide wings 27 and 28, respectively, on the valves engage in the passageways 20 and 21 to guide the axial movement of this valve assembly for control of the passageways.

Adjacent to the inlet leg 12, the wall of the body 10 is enlarged to provide a guide cup or sleeve 29 for receiving a stem 30 extending from a head 31. A lever 32 fulcrumed on a shaft 33 is bifurcated at its inner end to receive the stem 26 to be pivoted thereto by a pin 34, the lever at its outer end being bifurcated to receive the head 31 to which it is pivoted by a pin 35. The lever transmits the axial movements of the head 31 to the valve stem 26 for setting of the valve assembly for control of the inlet flows to the mixing chamber from the inlet bores 13 and 14, respectively.

Opposite to the guide cup 29, the body 10 has the longitudinally extending boss or enlargement 36 forming a continuation of the inlet leg 11. Upon its inner side the boss 36 has the recess 37 forming a pressure chamber whose inner side is spanned by a diaphragm 38 detachably secured as by screws 39. The middle portion of the diaphragm is engaged on its inner side by the top 40 of the head 31. A spring 41 encircling the guide cup 29 abuts the head 31 and tends to shift it outwardly for outward flexing of the diaphragm. A restricted vent passage X extends through the head 31 for connecting the chamber 37 with the mixing chamber 19.

Extending longitudinally through the boss 36 is a passageway 42 which communicates at its outer end with the inlet bore 13 and at its inner end communicates with the cross-passage 43 leading to a valve chamber 44 in the inner end of the boss. The inner end of the cross-passage 43 provides a valve seat 45 for a needle valve 46 which extends outwardly into the valve chamber from the mixed chamber 19. An annular flange 47 guides the needle valve and a spring 48 encircles the guide flange and abuts a collar 49 on the valve, the spring tending to hold the valve unseated. A flow passageway 50 connects the valve chamber 44 with the pressure chamber 37.

Extending into the outlet end 17 of the device is a lug 51 to which a bi-metal thermostat strip 52 is secured at its outer end by a screw 53, this bi-metal strip at its inner end engaging the inner end of the needle valve 46. Inwardly of the lug 51 a threaded lug 54 receives the threaded stem 55 on a hand wheel 56, the stem having the abutment end 57 engaging the bi-metal strip so that by turning of the hand wheel 56 the bi-metal strip may be adjusted relative to the needle valve for pre-setting for the desired outflow fluid temperature.

My improved device is particularly adaptable for receiving and mixing cold and hot water for delivery for service at a desired temperature. With the arrangement shown, the inlet bore 13 receives cold water, usually from a service line, under comparatively constant temperature and pressure, while the inlet bore 14 receives hot water from some source under temperature which may vary. In the arrangement shown, the bi-metal strip 52 will curl outwardly at its inner end under temperature increase to shift the needle valve toward its seat, and will curl inwardly under decreasing temperature to permit the spring 48 to move the needle valve away from its seat. Figure 2 shows the condition where there has been a surplus of hot water inflow which caused the bi-metal strip to shift the needle valve to its closed position to shut off flow from the inlet 13 to the pressure chamber 37. Upon cessation of flow to the pressure chamber, the spring 41 shifted the head 31 and the diaphragm outwardly, the entrapped water in the pressure chamber 37, during such outward movement of the diaphragm, flowing out through the small vent passageway X into the mixing chamber 19, the resulting movement of the lever 32 having closed the hot water inlet valve 25 and opened full the cold water inlet valve 24. Under influence of this cold water flow through the mixing chamber, the bi-metal strip is deflected away from the needle valve to permit the spring 48 to gradually unseat the valve whereupon flow from the cold water inlet to the pressure chamber 37 will be resumed. When the needle valve first opens, water flowing into the pressure chamber will escape through the small restricted passageway X into the mixing chamber, but, as the needle valve is opened further, pressure will build up in the pressure chamber behind the diaphragm and then water cannot escape fast enough through the passageway X, and the pressure on the diaphragm will overcome the pressure of the spring 41 and the lever 32 will be rocked for gradual opening of the hot water inlet valve and movement of the cold water inlet valve toward closing position, the inlet valve assembly then assuming its normal service position shown on Figure 1 to control and apportion the inflow of cold and hot water for the desired mixture temperature for service delivery. During normal service operation of the device, the moving parts will be so balanced that a small amount of water is continuously being metered past the needle valve into the pressure chamber 37 where the pressure will vary between close limits to cause the lever and inlet valve assembly to change positions slightly, metering alternately a slight excess of cold water and then of hot water but with the temperature of the delivered outflow within the desired limits as determined by the setting of the bi-metal strip by the hand wheel 56.

Should the cold water pressure vary for any reason, the pressure in the diaphragm chamber 37 under control of the thermostatically controlled needle valve will cooperate with the spring 41 to move the lever 32 for proper apportionment of the cold water and hot water inflow to the mixing chamber. If the cold water pressure should rise above normal, the lever 32 will be actuated and moved to reduce the inflow of cold water and increase the inflow of hot water, and if the cold water pressure should decrease below normal the lever 32 will move for setting of the inlet valve structure for increased cold water inflow and reduced hot water inflow.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A device for the purpose described comprising a mixing chamber, a first inlet for flow to the mixing chamber of fluid at one temperature and a second inlet for flow to the mixing chamber of fluid at different temperature, a valve assembly for controlling said inlets, setting means for said valve assembly, mechanical means tending to move said setting means for setting of said valve assembly for increased flow into the mixing chamber from said first inlet and decreased flow from said second inlet, fluid pressure operated means for moving said setting means to counteract said mechanical means for decreasing the flow from said first inlet and increasing the flow from said second inlet, said fluid pressure operated means being exposed on one side to the pressure in said mixing chamber, a fluid passageway connecting said first inlet with said fluid pressure means at the other side thereof, a metering valve interposed in said passageway for controlling the flow through said passageway, and means responsive to the temperature in said mixing chamber for engaging and controlling said metering valve to thereby control the pressure exerted by said fluid pressure means on said setting means.

2. A device for the purpose described comprising a mixing chamber, a first inlet for flow to said mixing chamber of fluid at one temperature and a second inlet for flow to the mixing chamber of fluid at different temperature, a valve assembly for controlling the flow from said inlets, spring means connected with said valve assembly tending to effect setting thereof for increased flow from said first inlet and decreased flow from said second inlet into said mixing chamber, a pressure chamber including a diaphragm connected with said valve assembly and exposed on one side directly to said mixing chamber, a passageway connecting said first inlet with said pressure chamber on the other side of said diaphragm, a metering valve interposed in said passageway for controlling the flow therethrough, and thermostat means subjected to the temperature of the mixed fluid in said mixing chamber for engaging and controlling said metering valve whereby the pressure in said pressure chamber will control the setting of the valve assembly for apportionment of the inflows from said inlets for maintaining at predetermined temperature the fluid to be delivered from said mixing chamber.

3. A device for the purpose described comprising a mixing chamber having a discharge outlet and having an inlet for cold water and another inlet for hot water, a valve assembly for controlling said inlets for apportionment of hot and cold water flow into the mixing chamber, spring means tending to set said valve assembly for increasing cold water flow and decreasing hot water flow, a fluid pressure chamber and a flow passage therebetween and said cold water inlet, means in said pressure chamber subjected on one side to the pressure in said mixing chamber and on its other side to the pressure in said passageway for moving said valving assembly for decreasing cold water flow and increasing hot water flow, and valve means interposed in said passageway and automatically directly controlled by the temperature of the outflow mixture for metering the flow through said flow passageway and thereby controlling the pressure in said pressure chamber for operation of said valve assembly for apportionment of cold and hot water flow for maintaining a predetermined temperature of the outflow mixture.

4. A device for the purpose described comprising a mixing chamber having a discharge outlet and having an inlet for cold water and another inlet for hot water, a valve assembly for controlling said inlets for apportionment of hot and cold water flow into the mixing chamber, spring means tending to set said valve assembly for increasing cold water flow and decreasing hot water flow, a fluid pressure chamber and a flow passageway therebetween and said cold water inlet, mean in said pressure chamber subjected on one side to the pressure in said mixing chamber and on its other side to the pressure in said passageway for moving said valving assembly for decreasing cold water flow and increasing hot water flow, valve means interposed in said flow passageway and automatically directly controlled by the temperature of the outflow mixture for metering the flow through said flow passageway and thereby controlling the pressure in said pressure chamber for operation of said valve assembly for apportionment of cold and hot water flow for maintaining a predetermined temperature of the outflow mixture, and a restricted vent passage for outflow of water from said pressure chamber to the mixing chamber as the flow through said flow passageway diminishes.

5. A device for the purpose described comprising a mixing chamber, a first inlet for flow to said mixing chamber of fluid at one temperature and a second inlet for flow to the mixing chamber of fluid at different temperature, a valve assembly for controlling the flow from said inlets, spring means connected with said valve assembly tending to effect setting thereof for increased flow from said first inlet and decreased flow from said second inlet into said mixing chamber, a pressure chamber including a diaphragm connected with said valve assembly and exposed on one side to the pressure in said mixing chamber, a passageway connecting said first inlet with said pressure chamber for pressure flow from said first inlet against the other side of said diaphragm, a metering valve interposed in said passageway for controlling the flow through said passageway, thermostat means subjected to the temperature of the mixed fluid in said mixing chamber for engaging and controlling said metering valve whereby the pressure in said pressure chamber will control the setting of the valve assembly for apportionment of the inflows from said inlets for maintaining at predetermined temperature the fluid to be delivered from said mixing chamber, and a restricted vent passage for outflow of water from said pressure chamber to the mixing chamber as the flow into said pressure chamber diminishes to thereby permit said spring means to function.

6. A device for proportioning fluids to produce therefrom a mixture having a controlled constant temperature comprising a body member defining a chamber, a temperature-sensitive element in said chamber adapted to move in response to temperature changes in the chamber, fluid supply conduits having ports opening directly into said chamber, valves controlling fluid flow through said ports, a diaphragm controlling said valves having one face exposed directly to said chamber and the other face exposed through a passageway to the fluid flow from one of said supply conduits, and a metering valve interposed in said passageway and actuated by said element to directly regulate the fluid flow to said other face of the diaphragm, whereby the temperature changes in said chamber will move said element to control the metering valve for varying the pressure differential on opposite faces of the diaphragm thereby controlling the setting of the valves relative to said ports.

7. An automatic temperature regulating fluid flow control device comprising a body member defining a chamber, a bi-metallic strip in said chamber having a free end movable in response to temperature variations in the chamber, an adjustable device limiting range of movement of said free end of the strip, a metering pin actuated by said free end of the strip, a first supply conduit having a port communicating directly with said chamber and having a metering passageway extending therefrom and communicating directly with said pin, a second supply conduit having a port communicating directly with said chamber, connected valves controlling fluid flow from said conduits through said ports into said chamber, a diaphragm having one end face exposed directly to said mixing chamber and a second face adapted to receive fluid from said metering pin through said metering passageway directly from the first conduit, said diaphragm having a bleeder passageway therethrough, and means connecting said diaphragm and said valves for co-movement whereby said bi-metallic strip controls the position of the metering pin to vary the pressure on one side of said diaphragm for regulating the position of said valves.

8. An automatic temperature regulated flow control device comprising a body member defining a mixing chamber, a bi-metallic strip in said chamber having a free end movable in response to temperature variations in the chamber, a metering pin in said mixing chamber actuated by said free end of the strip, an adjustable device accessible from outside the body member for limiting the extent of movement of the free end of the strip toward the metering pin, said body member having a recess in the mixing chamber portion thereof, a diaphragm mounted in the body covering said recess and exposed to the mixing chamber, said diaphragm having a bleeder passageway therethrough to relieve trapped fluid from said recess into the mixing chamber, a first supply conduit having a port communicating directly with said mixing chamber and having a metering passageway controlled by said metering pin extending to the recess, a second supply conduit having a port communicating directly with said mixing chamber, a valve member in said mixing chamber having heads on the ends thereof controlling fluid flow through said ports, a spring-pressed head in said mixing chamber acting on said diaphragm, a lever in said mixing chamber fulcrumed intermediate its end and pivotally connected at its ends respectively to said head and said valve member whereby pressure in said recess will be controlled solely by the temperature in said mixing chamber to actuate the diaphragm for moving the head to regulate the settings of the valve.

RUSSELL R. CURTIS.

REFERENCES CITED

The following references are of record in the file of this patent:

UNITED STATES PATENTS

| Number | Name | Date |
|---|---|---|
| 1,506,758 | Little | Sept. 2, 1924 |
| 1,824,057 | Robertshaw | Sept. 22, 1931 |
| 1,869,663 | Cartier | Aug. 2, 1932 |
| 2,308,165 | Fields | Jan. 12, 1943 |
| 2,308,235 | Fields | Jan. 12, 1943 |
| 2,069,040 | Lodder | Jan. 26, 1937 |
| 2,200,318 | Yonkers | May 14, 1940 |

FOREIGN PATENTS

| Number | Country | Date |
|---|---|---|
| 720,112 | French | Dec. 3, 1931 |